United States Patent [11] 3,544,724

[72] Inventor Frank L. Pento
Colts Neck, New Jersey
[21] Appl. No. 763,077
[22] Filed Sept. 27, 1968
[45] Patented Dec. 1, 1970
[73] Assignee Bell Telephone Laboratories, Inc.
Murray Hill, New Jersey
a corporation of New York

[54] PULSE CORRECTING SINGLE FREQUENCY SIGNALING RECEIVER
11 Claims, 10 Drawing Figs.

[52] U.S. Cl. ........................................ 179/16
[51] Int. Cl. ........................................ H04g 1/36, H04b 1/10
[50] Field of Search ........................................ 179/16.4, 84(VF)

[56] References Cited
UNITED STATES PATENTS
2,642,500 6/1953 Fritschi et al. ................179/84(VF)UX

*Primary Examiner*—Kathleen H. Claffy
*Assistant Examiner*—Randall P. Myers
*Attorneys*—R. J. Guenther and Edwin B. Cave

ABSTRACT: The two-speed pulse corrector circuit of a single-frequency signaling receiver employs a dual purpose sequential logic circuit in lieu of a memory system to provide for both pulse correction and for the processing of steady state supervisory signals.

INVENTOR
F. L. PENTO
BY
ATTORNEY

PULSE CORRECTING SINGLE FREQUENCY SIGNALING RECEIVER

BACKGROUND OF THE INVENTION

1. Field of the Invention

This invention relates to single-frequency signaling receivers and more particularly to the pulse correcting arrangements of such receivers.

2. Description of the Prior Art

Signaling, in telephone parlance, refers to the transmission of control information ancillary to the voice frequency message waves which carry the basic intelligence which the telephone system, as its primary function, is designed to transmit. In trunks interconnecting telephone central offices, typical signaling information includes those signals needed to establish and maintain each telephone connection, as well as those needed to terminate each connection subsequent to its establishment.

Because most present day long distance telephone trunks use carrier transmission, the most common signaling arrangements make use of one or more single frequency inband tones as signal indicia of the necessary control information. Such signaling arrangements are fully compatible with carrier trunks inasmuch as the tones can be transmitted in exactly the same way as the voice frequency message waves. These tones are termed "inband" to indicate that they fall within the same frequency band employed for the transmission of voice frequency messages.

In a typical inband signaling system, a series of substantially single frequency tone pulses within the voice band is transmitted over the telephone trunk from one central office to another to indicate a particular call destination. At the receiving end, the problem presented to the receiving equipment is essentially twofold. First, a determination must be made as to whether the signal is in fact a legitimate signal, rather than a spurious one that might be caused, for example, by a voice frequency message wave that includes a significant proportion of tone signaling frequency. If it is determined that the received tones are indeed a part of a message wave, the signal is merely amplified and passed along to the next transmitting point. If it is concluded, however, that the signal tone is a bona fide supervisory signal, it is diverted for specific processing. Signal processing generally involves the use of a pulse-correcting arrangement that examines the pulse length, the pulse interval and the pulse speed or repetition rate. Adjustments or connections are made, as necessary, to ensure that the pulse train will be recognized and interpreted properly after its transmission to the utilization equipment, which in a typical case may be the common or shared switching equipment at a central office. The need for careful pulse correction stems specifically from the fact that all switching equipment has certain limits as to the deviation it will tolerate in the pulse length, spacing and speed of applied signals.

In the prior art the pulse-correcting process has been accomplished by the employment of circuit arrangements requiring a memory capability, and this requirement has been met only by circuits characterized by undue cost and complexity. To complicate the problem further, steady state or steady tone signals are employed to indicate particular conditions, such as a nonbusy condition, and the pulse correcting circuitry must obviously handle such signals in a different manner since pulse correcting, in the sense described above, is not required. In the prior art the handling of steady state signals has required the employment of substantially separate circuitry leading, once again, to undue cost and complexity and, in some instances, to an undesirably low level of dependability.

SUMMARY OF THE INVENTION

The general object of the invention is to reduce the complexity and cost and to enhance the accuracy of pulse correcting arrangements of the type employed in single-frequency signaling systems. This object and related objects are achieved in accordance with the principles of the invention by the employment of multifunction logic circuitry, in lieu of conventional memory circuitry, that is operatively responsive to preselected output signal patterns and combinations from a sequential arrangement of timers. The timers include an operate timer, a release timer, a make timer and a break timer, each designed to analyze the corresponding pulse input characteristics and to introduce the required corrections. The existence of a steady state signal is recognized by the combined capabilities of the timing chain and the indicated logic circuitry to the end that an appropriate steady state signal is applied to the switching circuits and a time-selected filter insertion is made in a bypass speech path along with an opening of the normal speech path.

DETAILED DESCRIPTION

Figure 1:
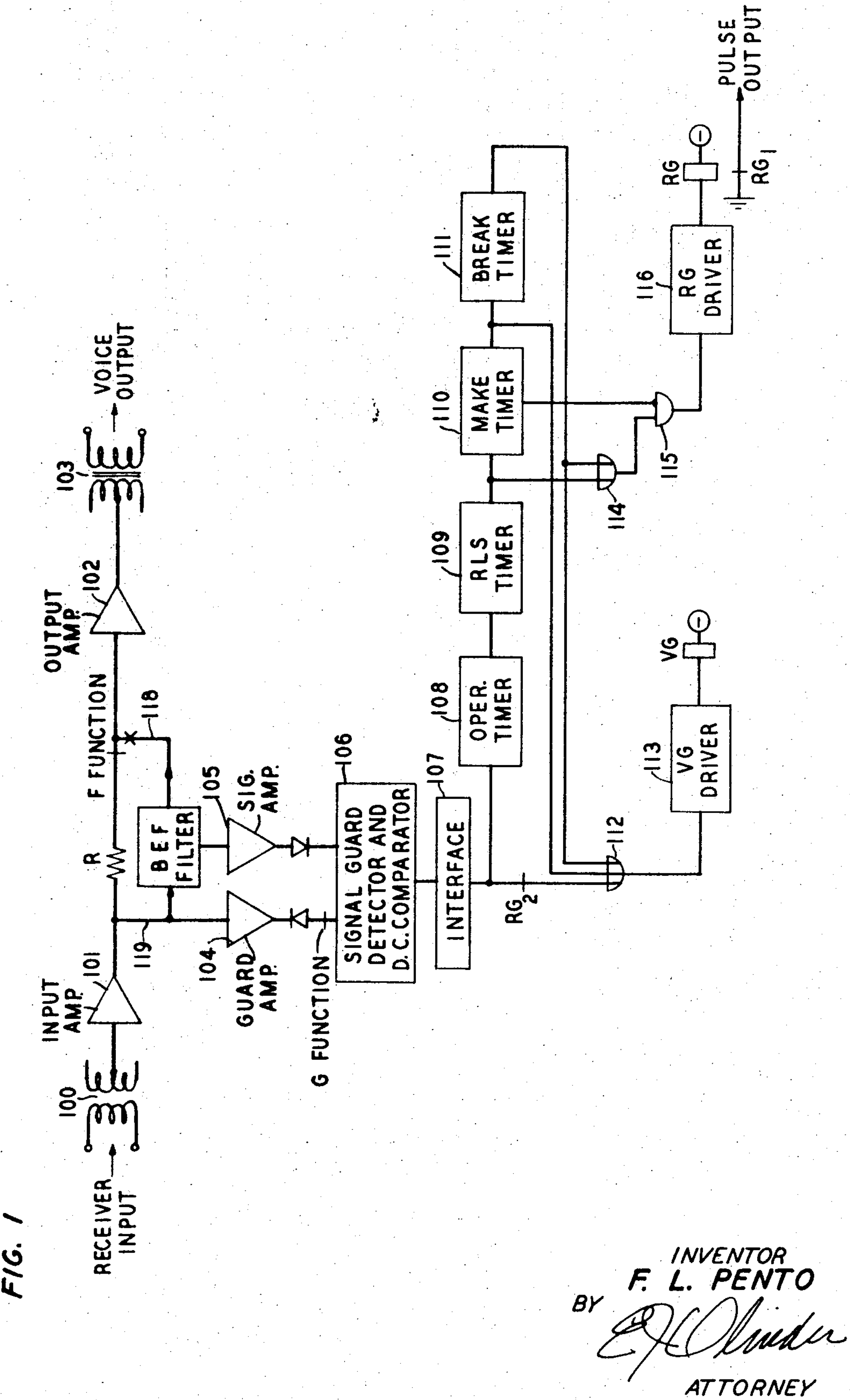
FIG. 1 is a block diagram of a signal receiver in accordance with the invention.

The receiver shown in block diagram form in FIG. 1 is made up of three basic parts: the voice transmission circuit, the signal guard circuit and the pulse corrector. The features of the invention lie primarily in the pulse corrector portion of the receiver, but a brief description of the voice transmission and signal guard circuits serves as a useful preface to a detailed discussion of the pulse corrector.

Received voice transmission normally proceeds from an input transformer 100 through an input amplifier 101 and thence to an output amplifier 102 by way of a resistance R. The output from the amplifier 102 is then applied to an output transformer 103. The amplifiers 101 and 102 provide the necessary impedance matching between the receiver and external connecting circuits while also providing the required gain for zero dB.-insertion loss. A filter circuit BEF provides an alternate path for the transmission of speech. The particular speech path to be employed is selected by relay contacts designated "F function", which designation signifies operation of the transfer contacts shown in response either to the operation of relay VG or of relay RG. Although as indicated above, voice transmission is through the bypass R, transmission in the presence of tone, a 2600 Hz. signal for example, is through the filter BEF. This voice path is provided to ensure continuity of voice transmission despite transient conditions or brief spurious signals which momentarily establish the F function. Filter insertion by means of relay contacts provides solid, rapid introduction of the filter while minimizing transient effects during removal of signal energy from the transmission path.

The filter BEF has a second output which is applied by way of a signal amplifier 105 to the signal guard detector and d.c. comparator circuit 106. A second input to the detector circuit 106 is taken directly from the output of amplifier 101 and is applied by way of a guard amplifier 104. The signal guard section of the receiver compares the relative amounts of signal and guard energy in a particular signal and, based on a predetermined weighting function, i.e., the signal-to-guard ratio, either allows or does not allow a detector switching stage to operate. The amplifier gains together with the filter characteristics fixes the signal-to-guard ratio and the operating bandwidth. Guard circuit operation of this type is substantially conventional as shown for example, in U.S. Pat. No. 3,349,191, issued to H. Mann on July 29, 1967.

The output of the signal guard detector circuit 106 is applied in accordance with the invention to drive the pulse corrector circuit which employs an interface circuit 107 and four "log 2-type" timing circuits including an operate timer 108, a release timer 109, a make timer 110 and a break timer 111. These timers, together with the logic circuitry which includes the OR gates 112 and 114 and the AND gate 115, control the relays VG and RG to provide a "two-speed" type of pulse correction. It is the RG relay through the operation of its break contact $RG_1$ that generates output pulsing for the corrector circuit.

In accordance with the invention, the pulse corrector output is only dependent on input period and, therefore, pulsing speed is independent of input percent break. As shown by the pulse corrector output plot in FIG. 10, the output is characterized by a constant break interval up to a particular pulsing speed and a constant make interval at higher pulsing rates, hence the term "two-speed". Further, in accordance with the invention, the change from constant break to constant make occurs at a pulsing speed which corresponds to a period determined by the sum of the constant break plus constant make intervals.

With respect to the particular function performed by each of the timers shown in FIG. 1, it should be noted that the first timing stage 108 is a separate delay timer which provides immunity to false short duration tone pulses and thus assists in the rejection of speech simulations. The function of the second timer, the release timer 109, is to provide holdover during pulsing in the presence of impulse-type noise, during detector failures which may occur as a result of noise, and during the idle condition when line hits or carrier failures cause short interruptions in applied tone signals. The make timer 110 provides control of the guaranteed make interval output and the break timer 111 controls the guaranteed break interval output.

The logic of the system is arranged, in accordance with the invention, to ensure that the make timer 110 will inhibit all outputs whenever it is timing. If the make timer 110 is not timing, however, an output will occur so long as the break timer 111 is timing, or if the release timer 109 is operated. Since the release timer 109 is d.c. coupled to the detector stage 106, its coupling to the logic chain, gates 112, 114 and 115, enables steady state supervision (steady tone signals) to be passed through the unit.

In accordance with the invention, steady state supervision is provided without the conventional requirement for the employment of memory stages such as successive flip-flop circuits, for example. Additionally, the pulse corrector provides for the establishment of a so-called "G function" which serves to operate the G function break contact between the guard amplifier 104 and the signal guard detector 106, the G function being defined as a condition which exists when the RG relay is operated and the VG relay is not operated, or as expressed in conventional notation:

$$G\ \text{function} = VG' \cdot RG$$

The pulse corrector ensures that the G function is established only after a timed interval following the application of steady tone to the receiver input point. The establishment of the G function initiates an increase in the holdover capability of the receiver by a factor of approximately 2 and, through the operation of the G function break contact, disables signal guard action in the receiver, thus placing the receiver in what may be described as a broadband condition.

Figure 3:
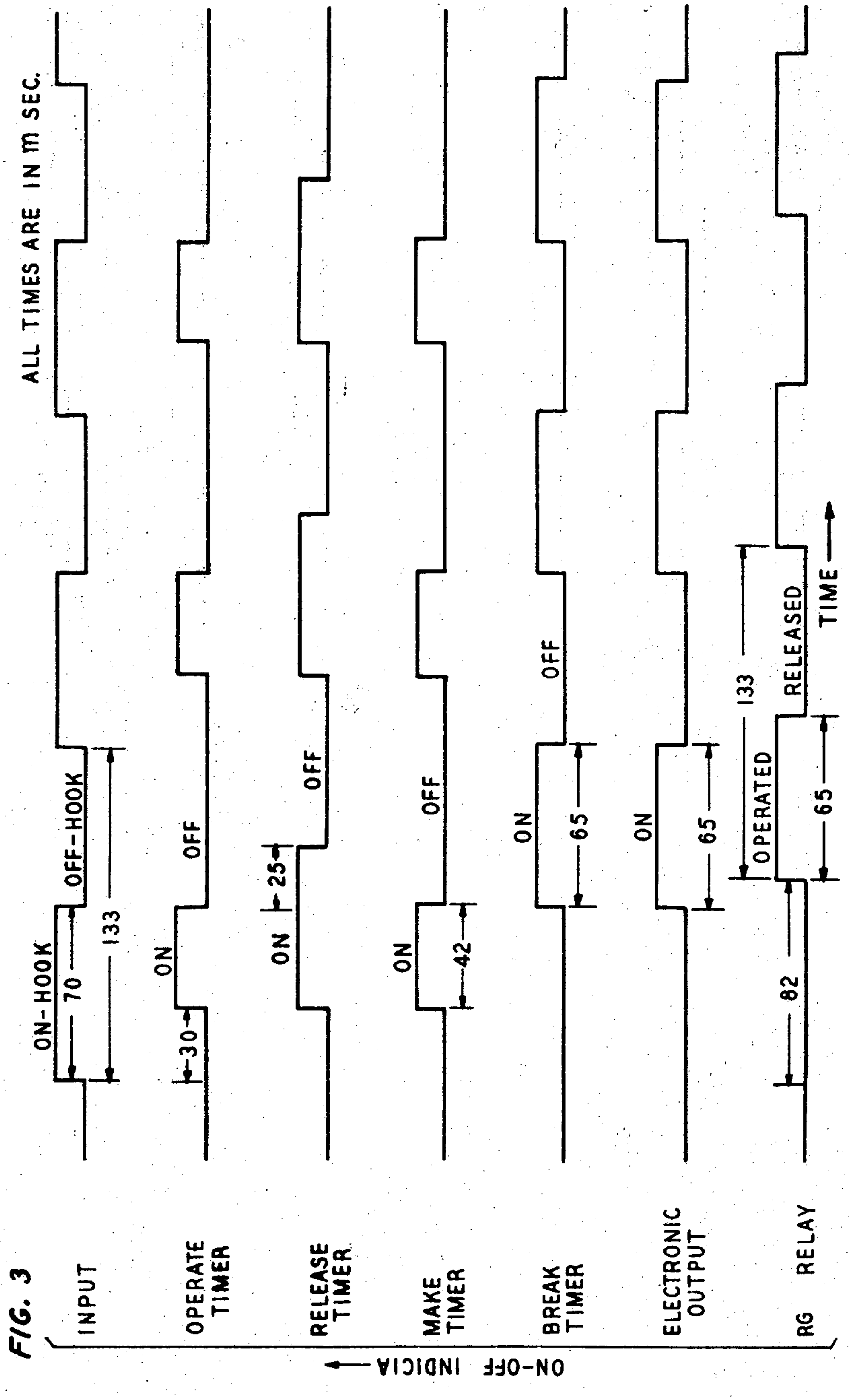
FIGS. 3 through 9 are time diagrams illustrating the operation of the pulse corrector circuit shown in FIGS. 1 and 2.

Further understanding of the principles of the operation of the pulse corrector portion of the circuit shown in FIG. 1 may be gained by considering specific illustrative examples. One such example is provided by the timing diagrams shown in FIG. 3 which illustrate the response of the pulse corrector to a low pulsing speed input of 7.5 pps. As indicated, it is the RG relay, through its break contact $RG_1$, which establishes the actual pulse output of the corrector circuit. In the diagram of FIG. 3 it is assumed, as shown, that the operate timer 108 has an operate time of 30 msec., that the release timer 109 has a release time of 25 msec., that the make timer 110 has a make time of 42 msec., that the break timer 111 has a break time of 65 msec. and that the RG relay operate and release time is 10 msec.

Figure 4:
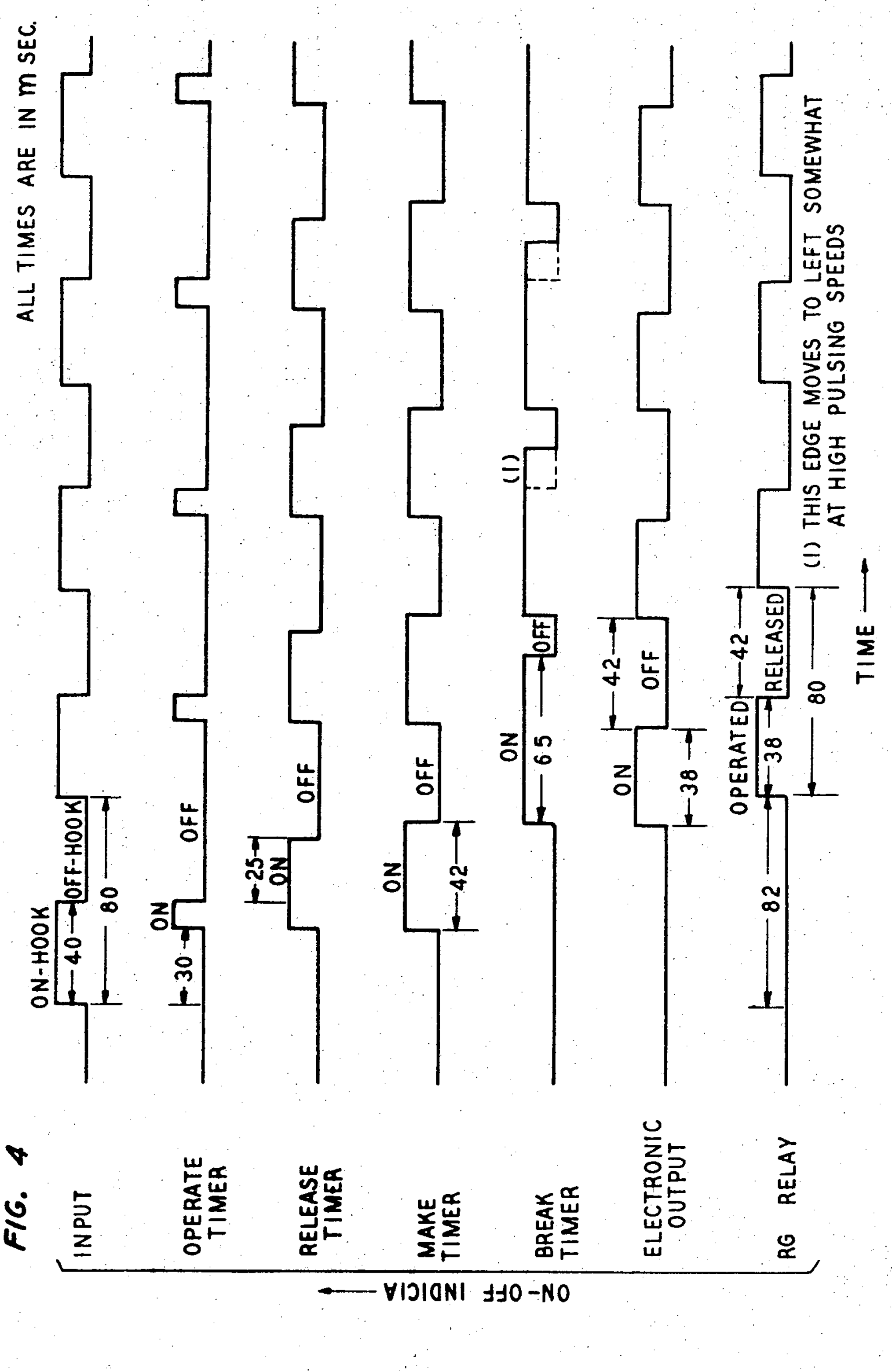

The timing diagram of FIG. 4 illustrates the response to an input of 12.5 pps. From FIGS. 3 and 4 it is important to note that the output is determined by the break timer for the pulse speed of 7.5 pps. and by the make timer for the pulse speed of 12.5 pps. It is apparent also that the output is independent of input percent break subject to the limitation that the threshold of the operate timer 108 must be overcome and that subsequent recycling time must be available for the operate timer at high percent breaks, such as 15 msec. for example. FIGS. 3 and 4 also demonstrate that the on-hook transmission delay through the pulse corrector is determined by the sum of the operate time delay, the make timer interval and the RG relay operate time. For purposes of illustration, in FIGS. 3 and 4 the on-hook transmission delay is assumed to be b82 msec.

Figure 5:
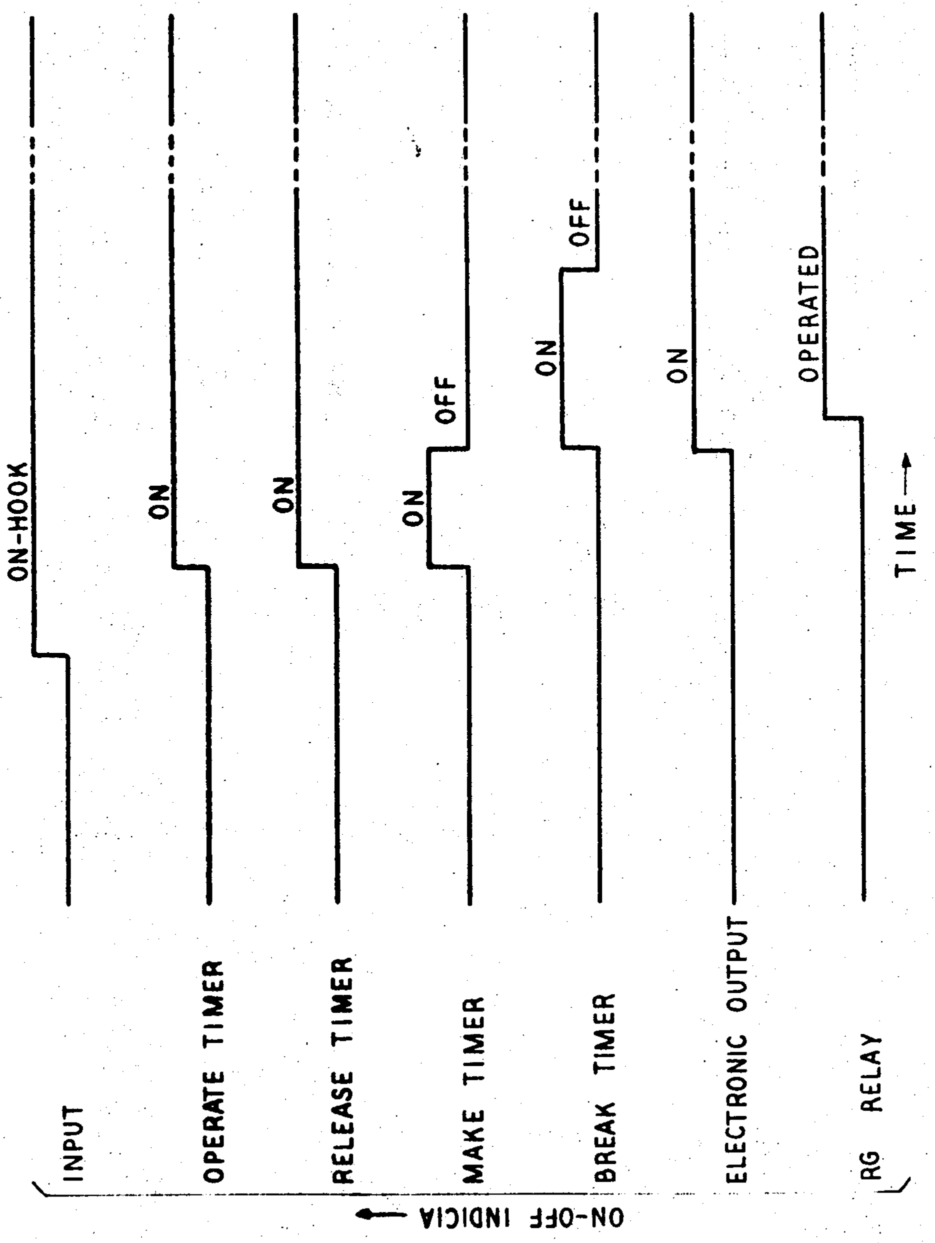
Figure 6:
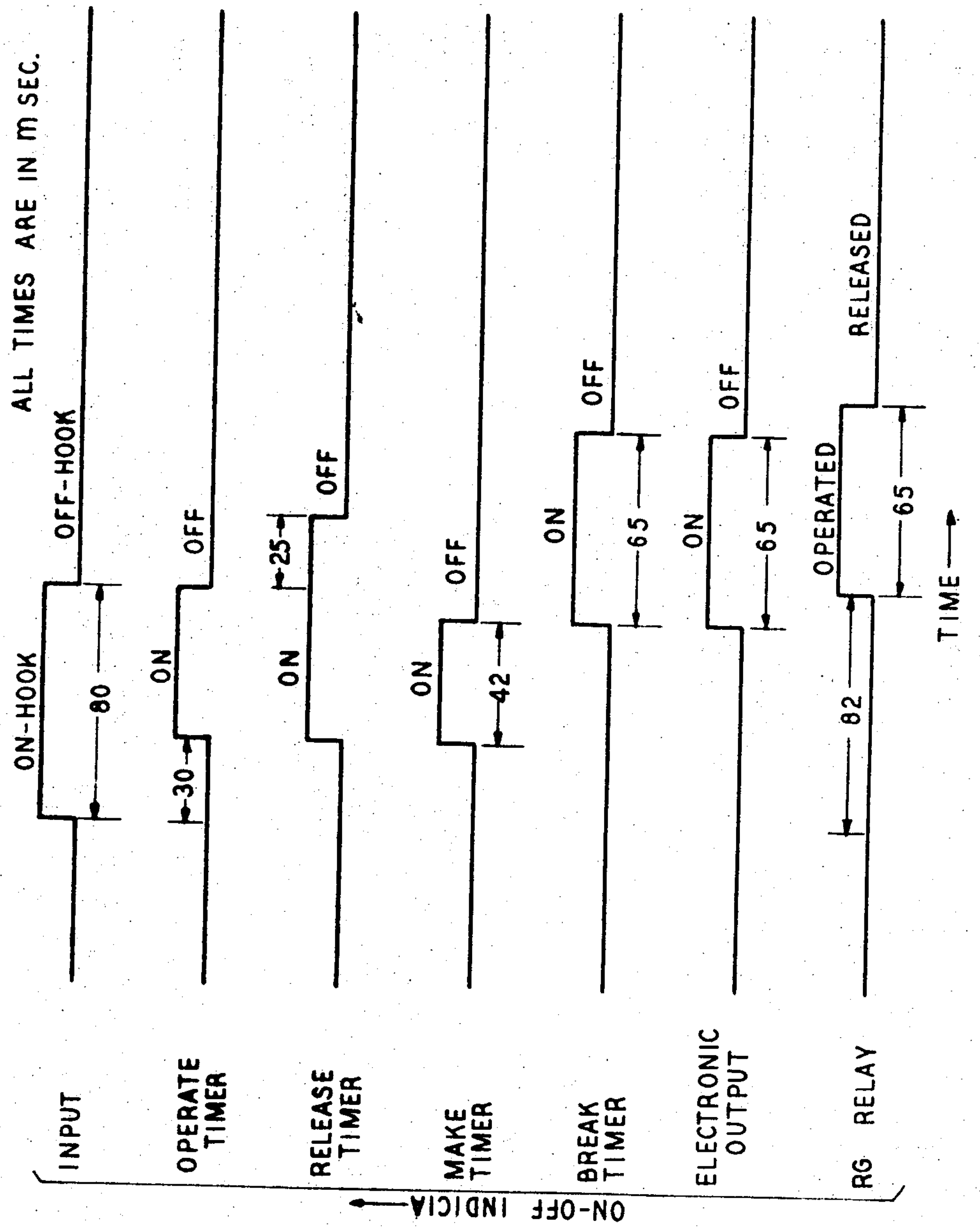
Figure 7:
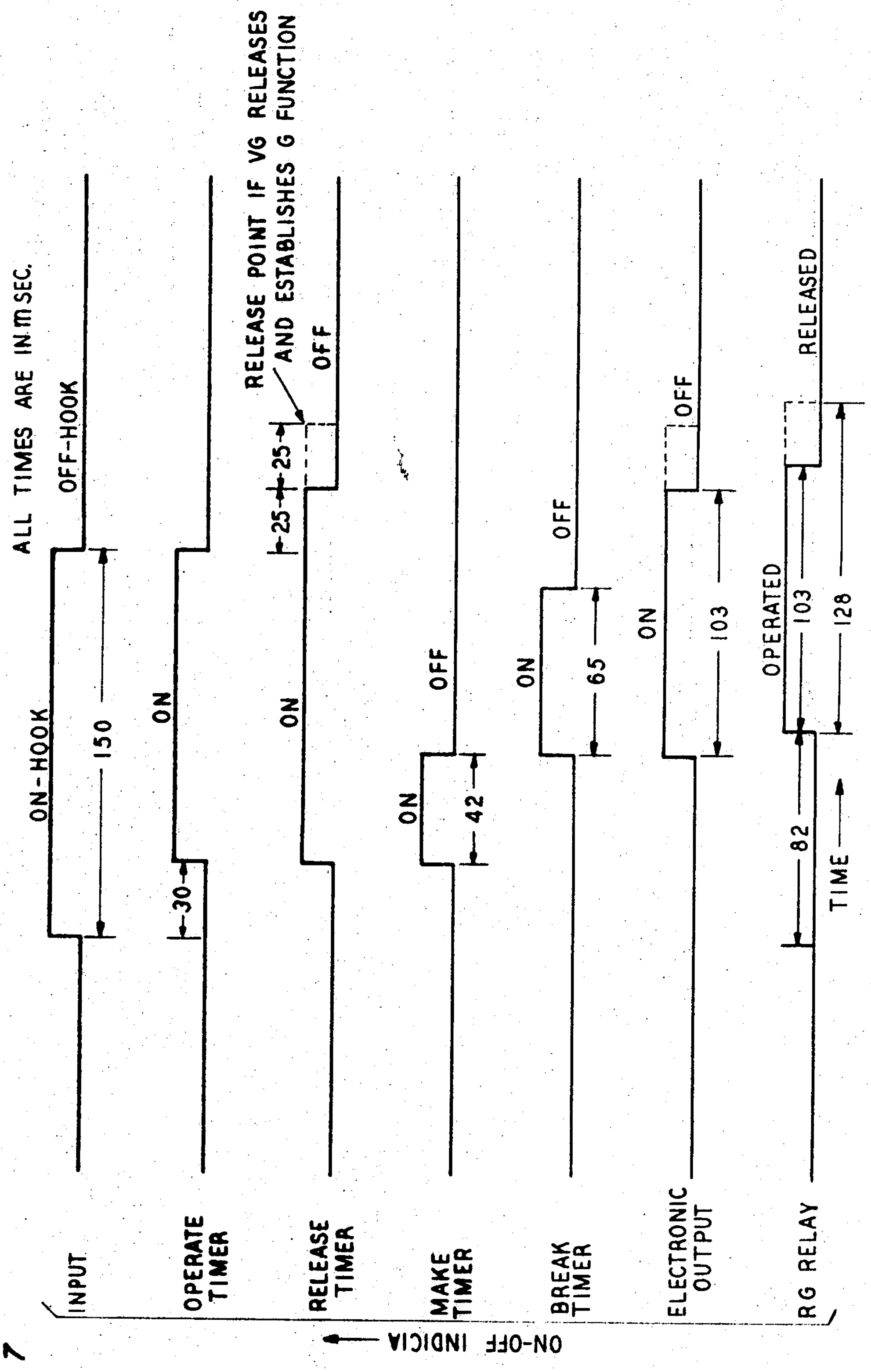

The timing diagram in FIG. 5 shows the response of the pulse corrector to a steady on-hook signal. It may be noted that the release timer, and therefore the input, holds up the output even after the break timer has timed out. FIGS. 6 and 7 show the response to a short, single on-hook pulse of 80 msec. and to a long single on-hook pulse of 150 msec., respectively.

FIG. 6 shows that the short pulse is stretched to give an output equal to the minimum break of 65 msec. and FIG. 7 shows that the long output is shortened by an interval which is equal to the sum of the operate time delay plus the make time interval minus the release time delay (47 msec. for this case). These time diagrams can be generalized to show that if the input signal pulse duration is between the "just operate" pulse and a pulse which is equal to the sum of the operate delay time, the make time interval and the break time interval minus the release time delay (112 msec.), it will cause an output which is equal to the break time interval (65 msec.). If the input duration is greater than the upper limit noted above, however, but less than that which causes the G function to be established, it will be reproduced with a negative distortion which is equal to the sum of the operate time delay plus the make time interval minus the release time delay (47 msec.). Also, if the input is greater than the G function insertion delay, the output is shortened by the sum of the operate time delay plus the make time interval minus the sum of the release time delay plus the increase in release time delay caused by the establishment of the G function (22 msec.). The table below summarizes the performance of an illustrative pulse corrector constructed in accordance with the principles of the invention.

TABLE

| | Msec. |
|---|---|
| Minimum break | 65 |
| Minimum make | 42 |
| Period at which transition from break to make control occurs | 107 |
| On-hook delay | 82 |
| Off-hook delay | 60 |
| Holdover (after G function) | 50 |
| Single pulse output for: | |
| 30 msec. ≤ Input ≤ 112 msec. | 65 |
| 112 msec. ≤ Input ≤ G Function. | (Input −47) |
| Input ≥ G Function | (Input −22) |

Figure 8:
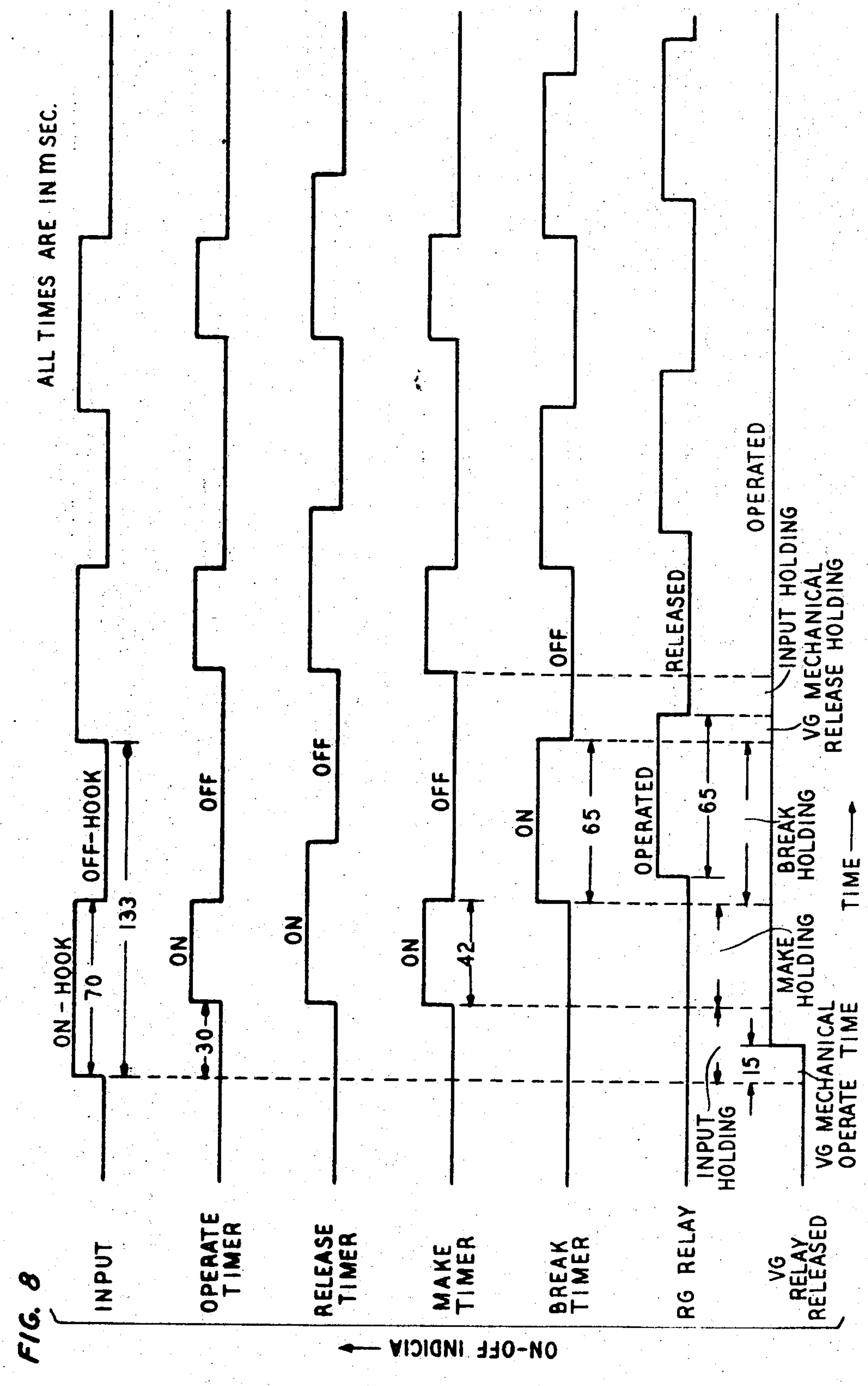
Figure 9:
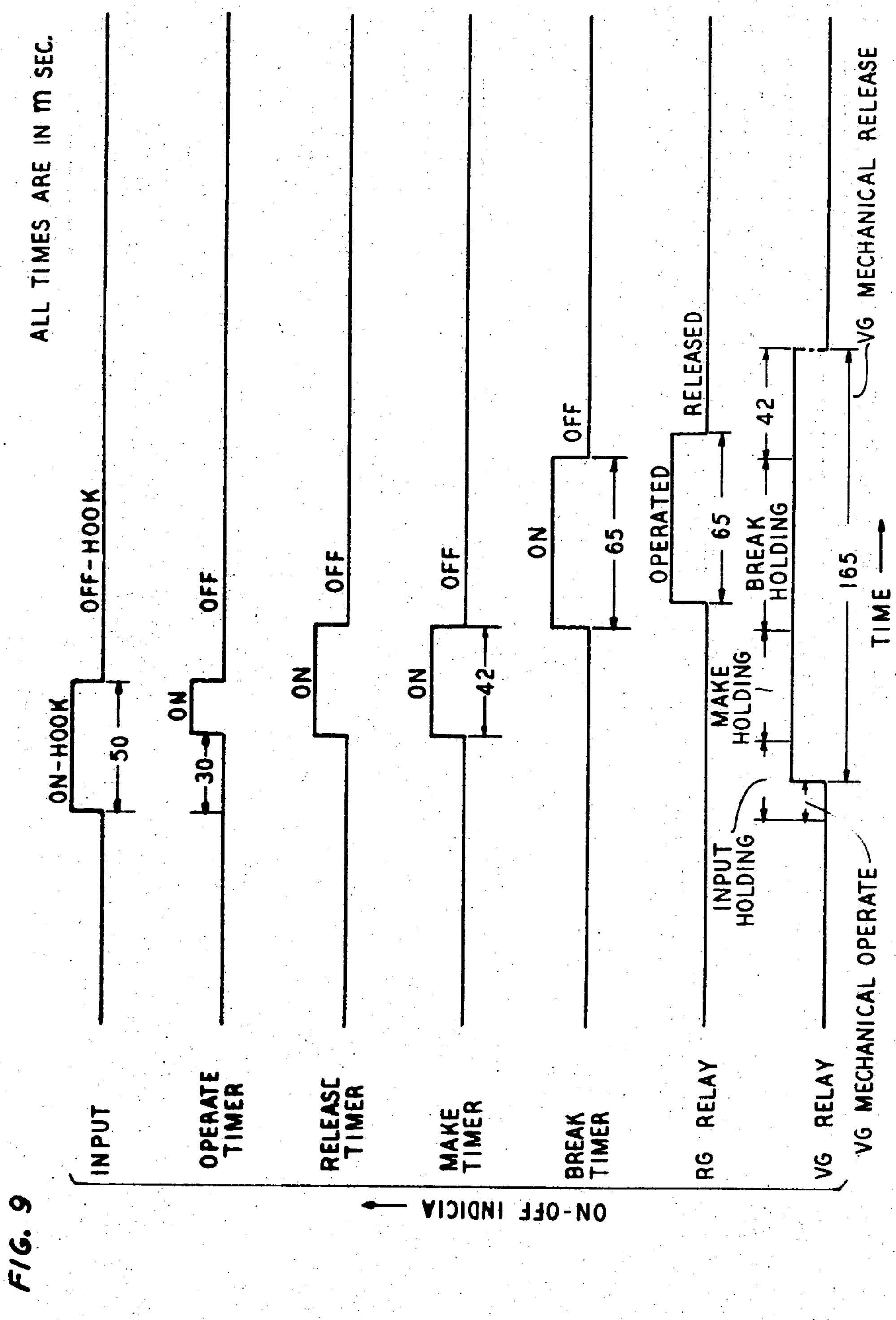

In accordance with the invention, the timing circuits in the pulse corrector are also employed to hold the VG relay operated during dial pulsing or for a minimum time of 150 msec. in the case of a single pulse. The VG relay is operated initially by way of the OR gate 112 and the VG driver circuit 113 when the signal guard detector 106 turns on and is held operated by the input. Subsequently, relay VG is held operated by the make timer 110 and finally by the break timer 111. When the RG relay operates, the VG relay control provided by the input is removed and the VG relay is placed under control of the make and break timers. The timing diagrams of FIGS. 8 and 9 show the response of the VG relay during dial pulsing at 7.5 pps. and for a single 50 msec. input, respectively. Note that during pulsing the VG relay always has a holding function except for a short 13 msec. interval at 7.5 pps. The mechanical release time of the relay guarantees holdover for this interval, and, therefore, the VG relay will remain operated during dial pulsing down to a pulse speed of 7.5 pps. The timing for the VG relay is thus obtained by utilization of the pulse corrector timers without the need for additional separate VG timing stages.

Figure 10:
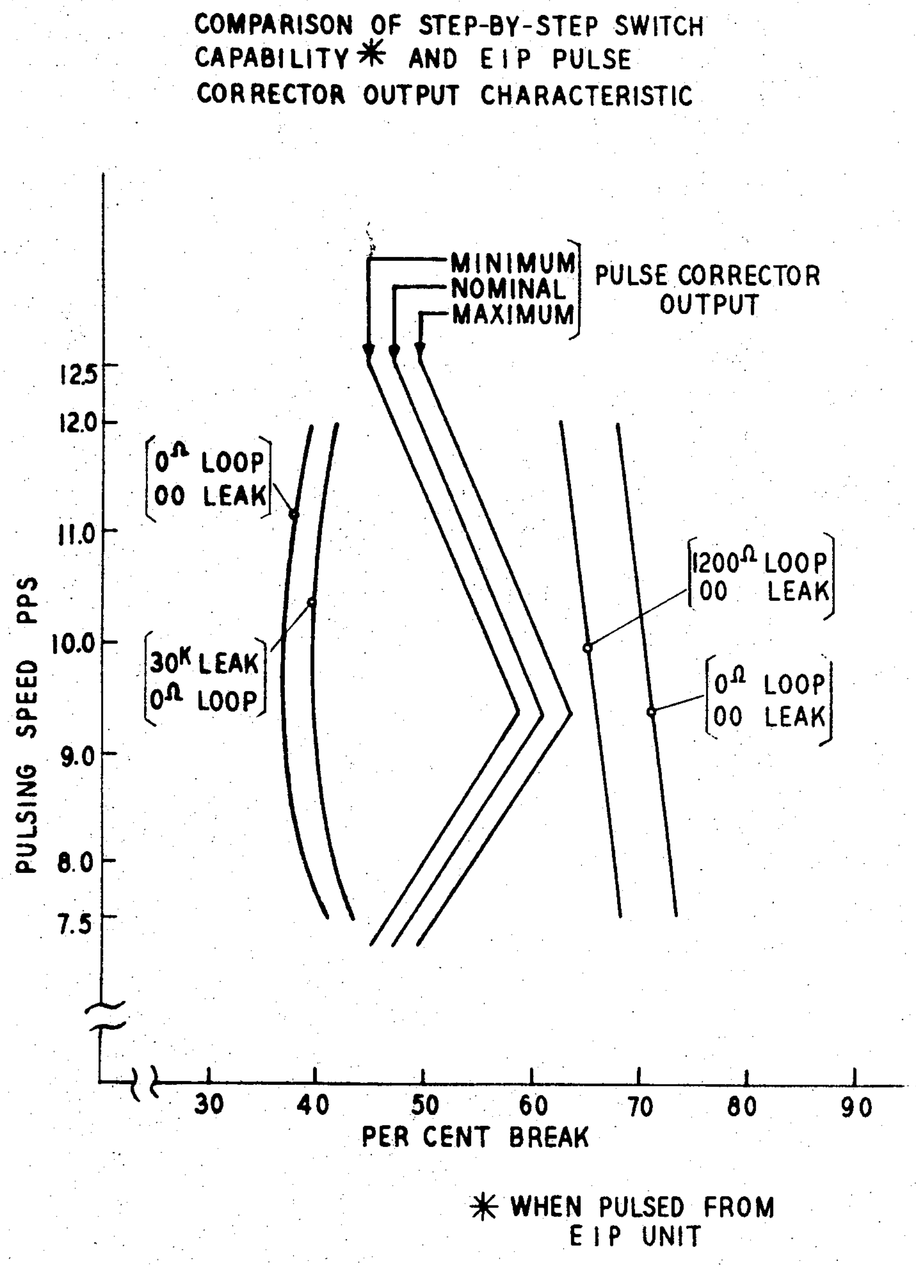
FIG. 10 is a plot of the acceptance characteristics of a step-by-step switching system combined with a plot of the pulse characteristics of a receiver in accordance with the invention.

Although it is evident that, in accordance with the invention, the limiting output pulse characteristics of the pulse corrector circuit shown in FIG. 1 may be tailored within wide limits to meet specific end requirements, the corrector has been found particularly advantageous as a means for ensuring that telephone signaling pulses fall within the acceptance limits, insofar as pulse repetition rate and make-break ratios are concerned, of a conventional step-by-step switching system. The acceptance limits of a step-by-step switching system for various loop conditions are shown graphically in FIG. 10. FIG. 10 also shows the output characteristics of a two-speed pulse corrector in accordance with the invention superimposed upon the step-by-step switching system limits. In this example the pulsing output of the corrector is set for a 65 msec. break interval and a 42 msec. make interval. The variations in the pulsing output can be held to within ±5 percent of the designed intervals which establish the maximum and minimum curves shown. As shown, the worst-case output of the system thus falls within the acceptance limits of the step-by-step system.

Figure 2:
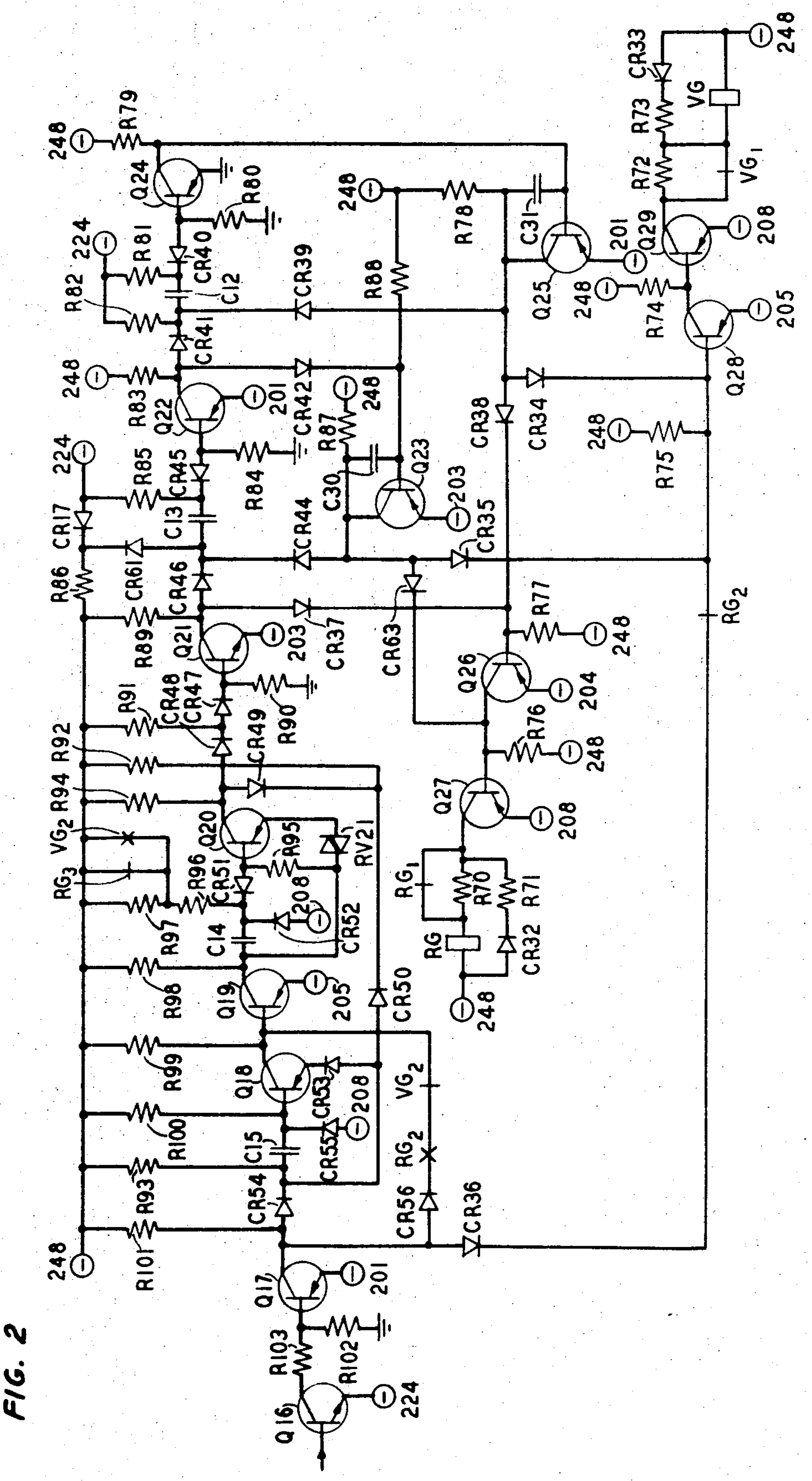
FIG. 2 is a schematic circuit diagram of the pulse corrector portion of the circuit shown in block form in FIG. 1.

An illustrative detailed circuit implementation of the block diagram pulse corrector of FIG. 1 is shown in FIG. 2. The interface circuit 107 shown in block form in FIG. 1 comprises transistors Q16 and Q17 which invert the output from the signal guard detector 106 (FIG. 1) and provide a low impedance output to drive the first timing stage which is transistor Q18. The sequence of the four serial timers following the interface circuit is as described above and as shown in FIG. 1, namely: (1) operate timer, (2) release timer, (3) make timer, and (4) break timer. The operate and release timers are both "log 2" delay timers whereas the make and break timers are "log 2" monopulsers.

When no tone is applied to the receiver, transistors Q17 and Q18 are initially off and the RG and VG relays are released. When tone is received, transistor Q17 turns on, providing a driving source to operate the VG relay through transistors Q28 and Q29. These transistors constitute the VG driver, block 113 of FIG. 1. Transistor Q18 does not immediately follow transistor Q17 in turning on, however, owing to the stored positive charge on capacitor C15. Instead, transistor Q18 remains off as capacitor C15 charges through the resistor R100 until the turn on threshold is overcome which may be after a period of approximately 30 msec. for example. When transistor Q18 turns on, transistors Q19 and Q20 immediately turn off and transistor Q21 turns on. Transistor Q20 is the active element of the release timer 109 (FIG. 1). Transistor Q21 provides the trigger signal to initiate operation of the monopulser comprising transistors Q22 and Q23. It is this monopulser which is the make timer 110 of FIG. 1. Transistor Q21 additionally provides an output generating function to transistor Q26 which, together with transistor Q27, constitutes the VG driver circuit 113 of FIG. 1.

The output function generated by transistor Q21 is simultaneously inhibited by the make timer (transistors Q22 and Q23) when it begins timing. The make timer is comprised principally of the transistors Q22 and Q23 together with capacitor C13 and resistor R85. When transistor Q21 turns on, the stored charge on capacitor C13 causes transistor Q22 to turn off which in turn causes transistor Q23 to turn on. When transistor Q23 turns on it locks the monopulser in a timing mode and inhibits the output function by holding transistor Q27 off through the diode CR63. Capacitor C13 continues to charge through the resistor R85 until transistor Q22 turns on which may require a period of approximately 42 msec. for example. When transistor Q22 turns on, the make timing interval is terminated and a trigger signal is provided to the break timer.

The principal elements of the break monopulser 111 (FIG. 1) include transistors Q24 and Q25, capacitor C12 and resistor R81. The function of transistors Q22 and Q23 and those of the capacitor C13 and the resistor R85 of the make monopulser are duplicated in the stages of the break timer. Accordingly, transistor Q24 turns off when transistor Q22 turns on and remains off for a preselected time interval, which may be on the order of 65 msec., controlled by capacitor C12 and resistor R81. During the break interval an output function is generated and applied to the logic circuitry.

Prior to a consideration of the logic circuitry, however, it is important to understand certain additional features concerning the operation of the release timer which employs transistor Q20 as its active element. When signaling tone is removed from the receiver, transistor Q19 turns on. Transistor Q20 remains off, however, until capacitor C14 charges through resistors R96 and R97 and its turn-on threshold is exceeded. When transistor Q20 turns on, the output generating function is removed, and the RG relay is allowed to release. When the "G function" is established (relay RG operated and relay VG released), increased holdover is obtained by insertion of the resistor R97 in the charging path of capacitor C14 and also by bypassing the operate timer. The operate timer, transistor Q18, must be bypassed so that the off intervals of the signal guard detector 106 (FIG. 1) will not be stretched beyond the limitations of the increased holdover circuit.

A pulse corrector in accordance with the invention employs two functionally separate logic control circuits. One controls the RG relay and the other the VG relay. The following Boolean expression, when applied to the RG relay as an output function, yields a two-speed characteristic:

$$\text{RG (Operated)} = (\text{INPUT} + \text{BREAK}) \cdot (\text{MAKE})'$$

which can be expressed in circuit terms as $$\text{RG (Operated)} = (\text{Q21 on or Q25 on}) \text{ and } (\text{Q23 off})$$

AThis relation indicates that if the make timer (transistors Q22 and Q23) is timing, transistor Q23 will be on and an output will be inhibited. If the make timer is not timing, however, an output will occur if the break timer (transistors Q24 and Q25) is in its timing mode, i.e., with transistor Q25 on, or if an input is present causing the release timer (transistor Q20) to be activated (transistor Q21 on).

The principal circuit elements of the logic circuits include the diodes CR37 and CR38, the transistors Q26 and Q27 and the diode CR CR63. If transistor Q23 of the make timer is on, the base of transistor Q27 is less negative than its emitter thus causing the transistor Q27 to be off, and the RG relay to be released. When transistor Q23 is off, transistor Q27 is under control of transistor Q26 which in turn is controlled either by transistor Q21 or by transistor Q25. If either transistor Q21 or transistor Q25 is on, transistor Q26 is necessarily off and transistor Q27 on, causing the RG relay to operate. If both transistors Q21 and Q25 are off, transistor Q26 is on thereby causing transistor Q27 to be off and the RG relay to be released. The logic circuits associated with the operation of the VG relay follows a logic function which may be expressed as follows:

$$\text{VG (Operated)} = \text{INPUT} \cdot \text{RG}' + \text{MAKE} + \text{BREAK}$$

Awhich in circuit terms can be expressed as: VG (Operated) = Q17 on and relay RG (released) or Q21 on or Q25 on.

The VG relay is operated when an input occurs and is held operated by the make timer (transistors Q22 and Q23) while it times out and then by the break timer (transistors Q24 and Q25) until it times out. When the RG relay operates, the input no longer controls the VG relay. The RG relay input disabling feature is provided so that the VG relay will operate and then release after a timed interval in response to steady single frequency tone. Use of the pulse corrector timers to control the VG relay permits the relay to be held operated for a timed interval without the need of any additional separate timing circuits.

Individual circuit elements including the resistors R70—103, the capacitors C12—15, 30 and 31, the diodes CR32—56, 17, 61 and 63 and the varistor RV21 have been designated in FIG. 2 for purposes of identification. The functions of transistor biasing, d.c. path control and voltage level control performed by these elements are substantially conventional and self-evident and accordingly detailed discussion of these functions has been omitted to ensure both clarity and brevity in the disclosure of the features of the invention.

It is to be understood that the embodiment described herein is merely illustrative of the principles of the invention. Various modifications thereto may be effected by persons skilled in the art without departing form the spirit and scope of the invention.

I claim:

1. In a receiver for the translation of speech signals and pulse signals, in combination, a combination speech signal and pulse signal transmission path, a guard signal circuit, a pulse corrector circuit including an operate timer, a release timer, a make timer and a break timer, an output relay for generating corrected pulses, a control relay, first logic circuitry for rendering said output relay responsive either to an output from said release timer or from said break timer in the absence of an output from said make timer, and second logic circuitry for rendering said control relay responsive either to input signals to said operate timer or to output signals from said break timer, combinations of contacts of said relays being employed for time selected filter insertion in said transmission path and for time-selected disabling of said guard signal circuit.

2. In a receiver for the translation of speech signals and pulse signals, a pulse corrector circuit including an operate timer, a release timer, a make timer and a break timer in tandem relation in the order indicated, a control relay, an output relay for generating corrected pulses, first logic means for rendering said control relay operatively responsive to any applied input pulse of at least a preselected minimum duration, said first logic means effecting continued operation of said control relay after the termination of said input pulse by applying thereto an output generated by said make timer, said first logic means effecting continued operation of said control relay after the termination of said output from said make timer by applying thereto an output generated by said break timer, second logic circuitry for rendering said output relay operatively responsive to the outputs of preselected ones of said timing circuits, combinations of contacts of said control relay and of said output relay being employed for controlling the routing of said pulse signals and of said speech signals within said receiver.

3. Apparatus in accordance with claim 2 wherein said first logic means includes an OR gate having inputs thereto from the output of said make timer, from the output of said break timer and an input in common with the input to said operate timer.

4. Apparatus in accordance with claim 2 wherein said second logic means includes an OR gate having an input from the output of said release timer and an input from the output of said break timer, a gate circuit having an inhibiting input from the output of said make timer and an operative input from the output of said OR gate, and means responsive to an output from said last named gate for applying an operating circuit to said output relay.

5. Apparatus in accordance with claim 2 wherein said make timer and said break timer each comprises a respective two-transistor log 2-type monopulser circuit and wherein said operate and release timers each comprises a respective single-transistor log 2-type delay circuit.

6. In a receiver for the translation of speech signals and pulse signals, a pulse corrector circuit including an operate timer, a release timer, a make timer and a break timer connected in tandem relation in the order indicated, a control relay, an output relay for generating corrected pulses, first logic means for placing the operation of said control relay under the control of said timers, thereby to avoid any need for separate timing circuits for said control relay, second logic means for placing the operation of said output relay under the control of said timers, and selected combinations of contacts of said control relay and said output relay for establishing routing paths for speech and for signaling pulses within said receivers.

7. Apparatus in accordance with claim 6 wherein said first logic circuitry includes an OR gate having inputs thereto from the output of said make timer, from the output of said break timer and an input in common with the input to said operate timer and means for applying the output of said OR gate to said control relay.

8. Apparatus in accordance with claim 6 wherein said second logic means includes an OR gate having an input from the output of said release timer and an input from the output of said break timer, a gate circuit having an inhibiting input from the output of said make timer and an operative input from the output of said OR gate, and means responsive to an output from said last-named gate for applying an operating circuit to said output relay.

9. Apparatus in accordance with claim 6 wherein said make timer and said break timer each comprises a respective two-transistor log 2-type monopulser circuit and wherein said operate and release timers each comprises a respective single-transistor log 2-type delay circuit.

10. Apparatus in accordance with claim 6 wherein said receiver includes a normal speech path having a resistance element therein and a filter circuit connectable in shunt relation with said resistance, one of said selected combinations of contacts being positioned to facilitate connecting said filter circuit in said shunt relation and to open said normal speech path.

11. Apparatus in accordance with claim 10 including a signal guard detector and comparator circuit, a guard signal amplifier connected between one terminal of said resistance and the input of said detector circuit, a signal amplifier connected between said filter circuit and said detector circuit, and means connecting the output of said detector circuit to the input of said operate timer, another of said selected combinations of contacts being positioned to facilitate disabling of said guard signal amplifier.